(12) United States Patent
Jeong et al.

(10) Patent No.: US 11,997,744 B2
(45) Date of Patent: May 28, 2024

(54) METHOD AND APPARATUS FOR SIDELINK DRX OPERATIONS IN A WIRELESS COMMUNICATION SYSTEM

(71) Applicant: Samsung Electronics Co., Ltd., Suwon-si (KR)

(72) Inventors: Kyeongin Jeong, Allen, TX (US); Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 235 days.

(21) Appl. No.: 17/367,132

(22) Filed: Jul. 2, 2021

(65) Prior Publication Data

US 2022/0015186 A1    Jan. 13, 2022

Related U.S. Application Data

(60) Provisional application No. 63/164,367, filed on Mar. 22, 2021, provisional application No. 63/137,665, (Continued)

(51) Int. Cl.
*H04W 76/28* (2018.01)
*H04L 1/1812* (2023.01)
*H04W 72/20* (2023.01)

(52) U.S. Cl.
CPC .......... *H04W 76/28* (2018.02); *H04L 1/1816* (2013.01); *H04W 72/20* (2023.01)

(58) Field of Classification Search
CPC . H04W 76/28; H04W 72/20; H04W 52/0216; H04W 52/028; H04W 92/18;
(Continued)

(56) References Cited

U.S. PATENT DOCUMENTS

2019/0174411 A1   6/2019  Xu et al.
2020/0389900 A1*  12/2020  Lee .............. H04W 72/53

FOREIGN PATENT DOCUMENTS

EP   3499975 A1 *  6/2019  ............ H04W 52/02
EP   3499975 A1    6/2019
(Continued)

OTHER PUBLICATIONS

Hua Wei et al., 'Draft CR on TS 38.321 on the remaining MAC Open issues for 5G V2X with NR SL', R2-2003556, 3GPP TSG-RAN WG2 Meeting #109-bis electronic, Apr. 10, 2020. (Year: 2020).*

(Continued)

*Primary Examiner* — Tejis Daya
*Assistant Examiner* — Oladiran Gideon Olaleye

(57) ABSTRACT

Methods and apparatuses in a wireless communication system. A method of a first UE comprises: receiving, from a second UE, a first PSCCH and a first PSSCH, wherein the first PSCCH and the first PSSCH include SCI comprising a source ID, a destination ID, and SL DRX time information indicating when the first UE monitors or skips at least one of a second PSCCH and a second PSSCH for the SL DRX operation; configuring SL DRX timers per pair of the source ID and the destination ID; configuring a value of at least one of the SL DRX timers based on information of the SCI; and receiving the at least one of the second PSCCH and the second PSSCH based on the SL DRX timers when the SL DRX operation is applied to a SL communication identified by the pair of the source ID and destination ID.

12 Claims, 11 Drawing Sheets

Related U.S. Application Data filed on Jan. 14, 2021, provisional application No. 63/104,450, filed on Oct. 22, 2020, provisional application No. 63/057,849, filed on Jul. 28, 2020, provisional application No. 63/056,208, filed on Jul. 24, 2020, provisional application No. 63/049,559, filed on Jul. 8, 2020.

(58) Field of Classification Search
CPC ... H04L 1/1816; H04L 1/1854; H04L 1/1893; H04L 1/1851; H04L 1/1896; Y02D 30/70
USPC .......................................................... 370/329
See application file for complete search history.

(56) References Cited

FOREIGN PATENT DOCUMENTS

| EP | 3609259 A1 | 2/2020 | |
|----|------------|--------|---|
| EP | 4135417 A1 | 2/2023 | |
| WO | WO-2017078783 A1 * | 5/2017 | |
| WO | WO-2018084796 A1 * | 5/2018 | ............... H04B 7/15 |
| WO | WO-2018186667 A1 * | 10/2018 | ........ H04W 56/0015 |
| WO | 2020/060890 A1 | 3/2020 | |
| WO | WO-2020060890 A1 * | 3/2020 | ........ H04W 52/0216 |
| WO | WO-2020091346 A1 * | 5/2020 | |

OTHER PUBLICATIONS

Huawei, HiSilicon, "Draft CR on TS 38.321 on the remaining MAC Open issues for 5G V2X with NR SL", Change Request, 3GPP TSG-RAN WG2 Meeting #109-bis electronic, Apr. 20-30, 2020, R2-2003556, 20 pages.

International Search Report dated Oct. 13, 2021 in connection with International Patent Application No. PCT/KR2021/008596, 3 pages.

Written Opinion of the International Searching Authority dated Oct. 13, 2021 in connection with International Patent Application No. PCT/KR2021/008596, 4 pages.

"5G; NR; Physical channels and modulation (3GPP TS 38.211 version 16.2.0 Release 16)", ETSI TS 138 211 V16.2.0, Jul. 2020, 136 pages.

"5G; NR; Multiplexing and channel coding (3GPP TS 38.212 version 16.2.0 Release 16)", ETSI TS 138 212 V16.2.0, Jul. 2020, 154 pages.

"5G; NR; Physical layer procedures for control (3GPP TS 38.213 version 16.2.0 Release 16)", ETSI TS 138 213 V16.2.0, Jul. 2020, 180 pages.

"5G; NR; Physical layer procedures for data (3GPP TS 38.214 version 16.2.0 Release 16)", ETSI TS 138 214 V16.2.0, Jul. 2020, 167 pages.

"5G; NR; Physical layer measurements (3GPP TS 38.215 version 16.2.0 Release 16)", ETSI TS 138 215 V16.2.0, Jul. 2020, 30 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Link Control (RLC) protocol specification (3GPP TS 38.322 version 16.1.0 Release 16)", ETSI TS 138 322 V16.1.0, Jul. 2020, 36 pages.

"5G; NR; Packet Data Convergence Protocol (PDCP) specification (3GPP TS 38.323 version 16.1.0 Release 16)", ETSI TS 138 323 V16.1.0, Jul. 2020, 43 pages.

"5G; NR; Radio Resource Control (RRC) protocol specification (3GPP TS 38.331 version 16.1.0 Release 16)", ETSI TS 138 331 V16.1.0, Jul. 2020, 886 pages.

"LTE; 5G; Evolved Universal Terrestrial Radio Access (E-UTRA) and NR; Service Data Adaptation Protocol (SDAP) specification (3GPP TS 37.324 version 16.1.0 Release 16)", ETSI TS 137 324 V16.1.0, Sep. 2020, 19 pages.

Extended European Search Report issued Dec. 12, 2023 regarding Application No. 21837730.7, 13 pages.

LG Electronics Inc. (Rapporteur), "Report of [Post109bis-e][957][V2X]: MAC issues (LG)", 3GPP TSG-RAN WG2 #110-e, R2-2005720, Jun. 2020, 97 pages.

\* cited by examiner

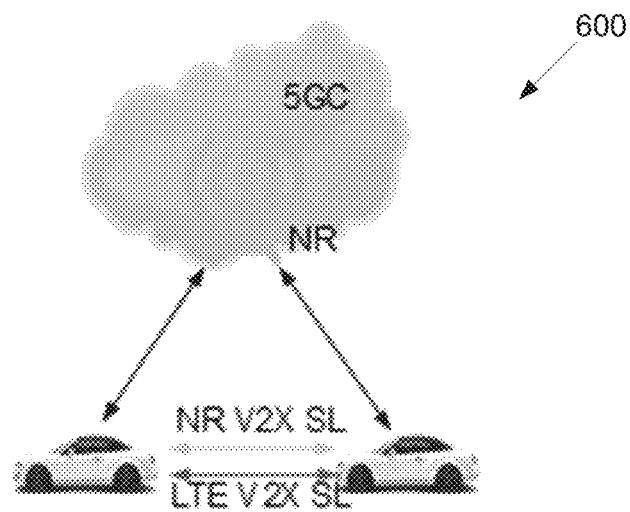
FIG. 6
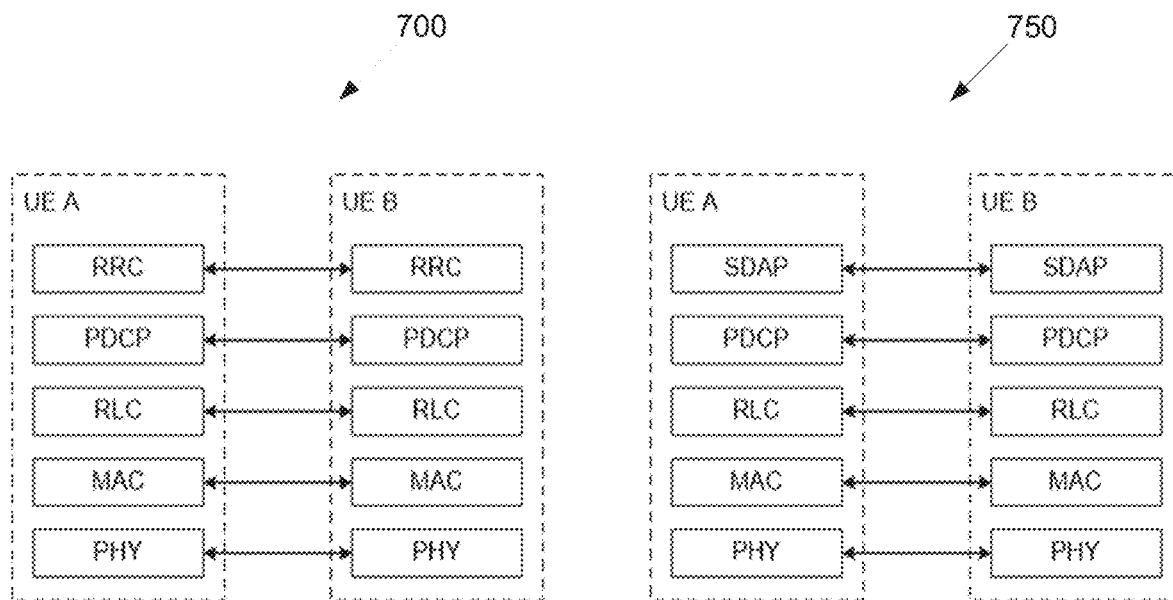
FIG. 7A
FIG. 7B

METHOD AND APPARATUS FOR SIDELINK DRX OPERATIONS IN A WIRELESS COMMUNICATION SYSTEM

CROSS-REFERENCE TO RELATED APPLICATIONS AND CLAIM OF PRIORITY

The present application claims priority to: U.S. Provisional Patent Application No. 63/049,559, filed on Jul. 8, 2020;
U.S. Provisional Patent Application No. 63/056,208, filed on Jul. 24, 2020;
U.S. Provisional Patent Application No. 63/057,849, filed on Jul. 28, 2020;
U.S. Provisional Patent Application No. 63/104,450, filed on Oct. 22, 2020;
U.S. Provisional Patent Application No. 63/137,665, filed on Jan. 14, 2021; and
U.S. Provisional Patent Application No. 63/164,367, filed on Mar. 22, 2021. The content of the above-identified patent document is incorporated herein by reference.

TECHNICAL FIELD

The present disclosure relates generally to wireless communication systems and, more specifically, the present disclosure relates to a sidelink discontinuous reception (DRX) operation.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates a sidelink DRX operation.

In one embodiment, a first user equipment (UE) is provided. The first UE comprises a transceiver configured to receive, from a second UE for a sidelink (SL) discontinuous reception (DRX) operation, a first physical sidelink control channel (PSCCH) and a first physical sidelink shared channel (PSSCH), wherein the first PSCCH and the first PSSCH include sidelink control information (SCI) comprising a source identification (ID), a destination ID, and SL DRX time information indicating when the first UE monitors or skips at least one of a second PSCCH and a second PSSCH for the SL DRX operation. The first UE further comprises a processor operably connected to the transceiver, the processor configured to configure SL DRX timers per pair of the source ID and the destination ID and configure a value of at least one of the SL DRX timers based on information of the SCI/The transceiver of the first UE is further configured to receive the at least one of the second PSCCH and the second PSSCH based on the SL DRX timers when the SL DRX operation is applied to a SL communication identified by the pair of the source ID and destination ID.

In another embodiment, a method of a first UE is provided. The method comprises: receiving, from a second UE for a SL DRX operation, a first PSCCH and a first PSSCH, wherein the first PSCCH and the first PSSCH include SCI comprising a source ID, a destination ID, and SL DRX time information indicating when the first UE monitors or skips at least one of a second PSCCH and a second PSSCH for the SL DRX operation; configuring SL DRX timers per pair of the source ID and the destination ID; configuring a value of at least one of the SL DRX timers based on information of the SCI; and receiving the at least one of the second PSCCH and the second PSSCH based on the SL DRX timers when the SL DRX operation is applied to a SL communication identified by the pair of the source ID and destination ID.

In yet another embodiment, a second UE is provided. The second UE comprises: a processor and a transceiver operably connected to the processor, the transceiver configured to: transmit, to a first UE for a SL DRX operation, a first PSCCH and a first PSSCH, wherein the first PSCCH and the first PSSCH include SCI comprising a source ID, a destination ID, and SL DRX time information indicating when the first UE monitors or skips at least one of a second PSCCH and a second PSSCH for the SL DRX operation; and transmit, the first UE for the SL DRX operation, the at least one of the second PSCCH and the second PSSCH based on the SL DRX timers when the SL DRX operation is applied to a SL communication identified by a pair of the source ID and destination ID, wherein the SL DRX timers is configured per the pair of the source ID and the destination ID, and a value of at least one of the SL DRX timers is configured based on information of the SCI.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example V2X communication over sidelink according to embodiments of the present disclosure;

FIG. 7A illustrates an SL control plane radio control (RRC) protocol stack;

FIG. 7B illustrates an SL user plane data radio protocol stack;

DETAILED DESCRIPTION

FIG. 1 through FIG. 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v.16.2.0, "Physical channels and modulation"; 3GPP TS 38.212 v.16.2.0, "Multiplexing and channel coding"; 3GPP TS 38.213 v16.2.0, "NR; Physical Layer Procedures for Control"; 3GPP TS 38.214: v.16.2.0, "Physical layer procedures for data"; 3GPP TS 38.215 v.16.2.0 "Physical layer measurements"; 3GPP TS 38.321 v16.1.0, "Medium Access Control (MAC) protocol specification"; 3GPP TS 38.322 v.16.1.0, "Radio Link Control (RLC) protocol specification"; 3GPP TS 38.323, v.16.1.0 "Packet Data Convergence Protocol (PDCP) specification"; 3GPP TS 38.331v.16.1.0. "Radio Resource Control (RRC) protocol specification"; and 3GPP TS 37.324 v.16.1.0, "Service Data Adaptation Protocol (SDAP) specification."

Figure 1:
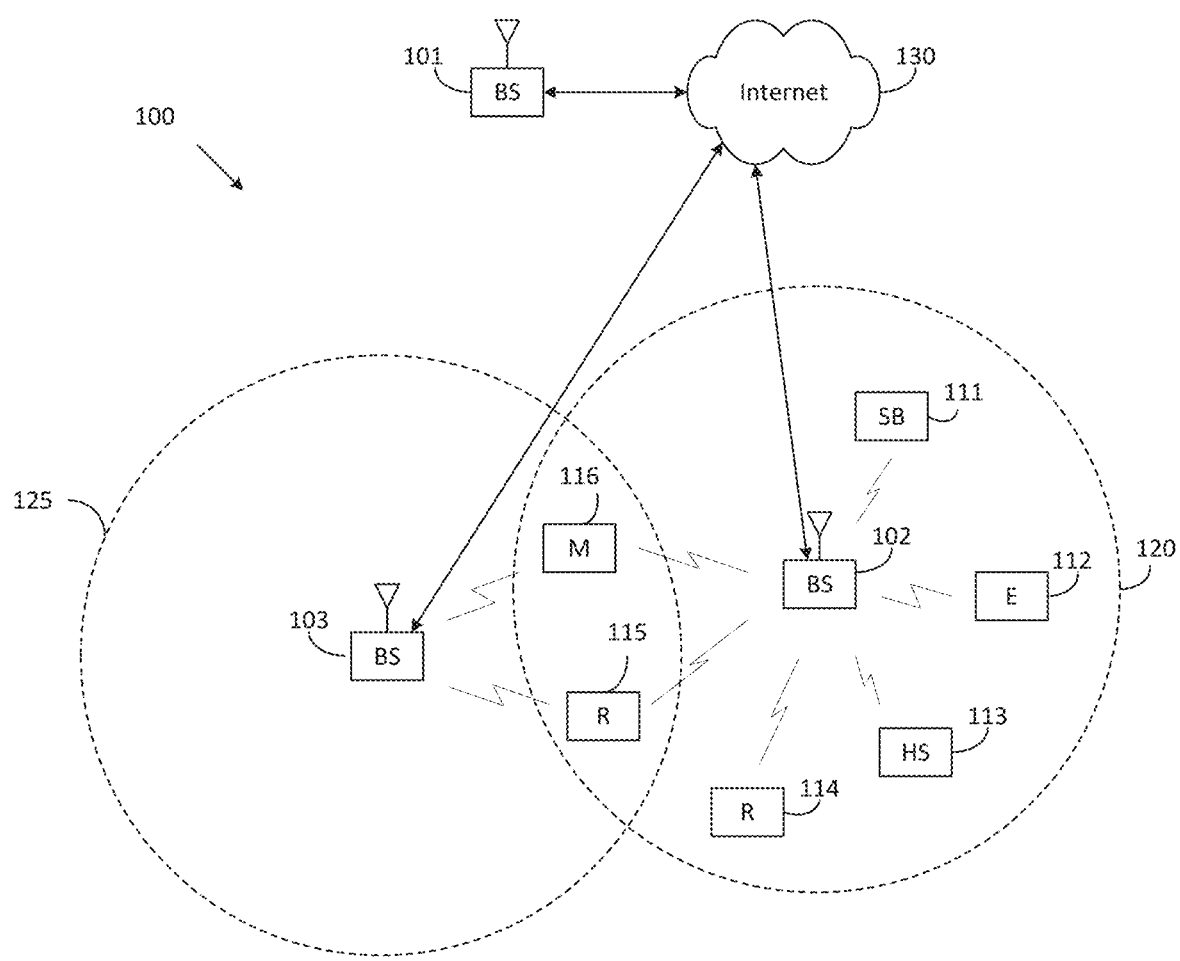
FIG. 1 illustrates an example wireless network according to embodiments of the present disclosure.
Figure 2:
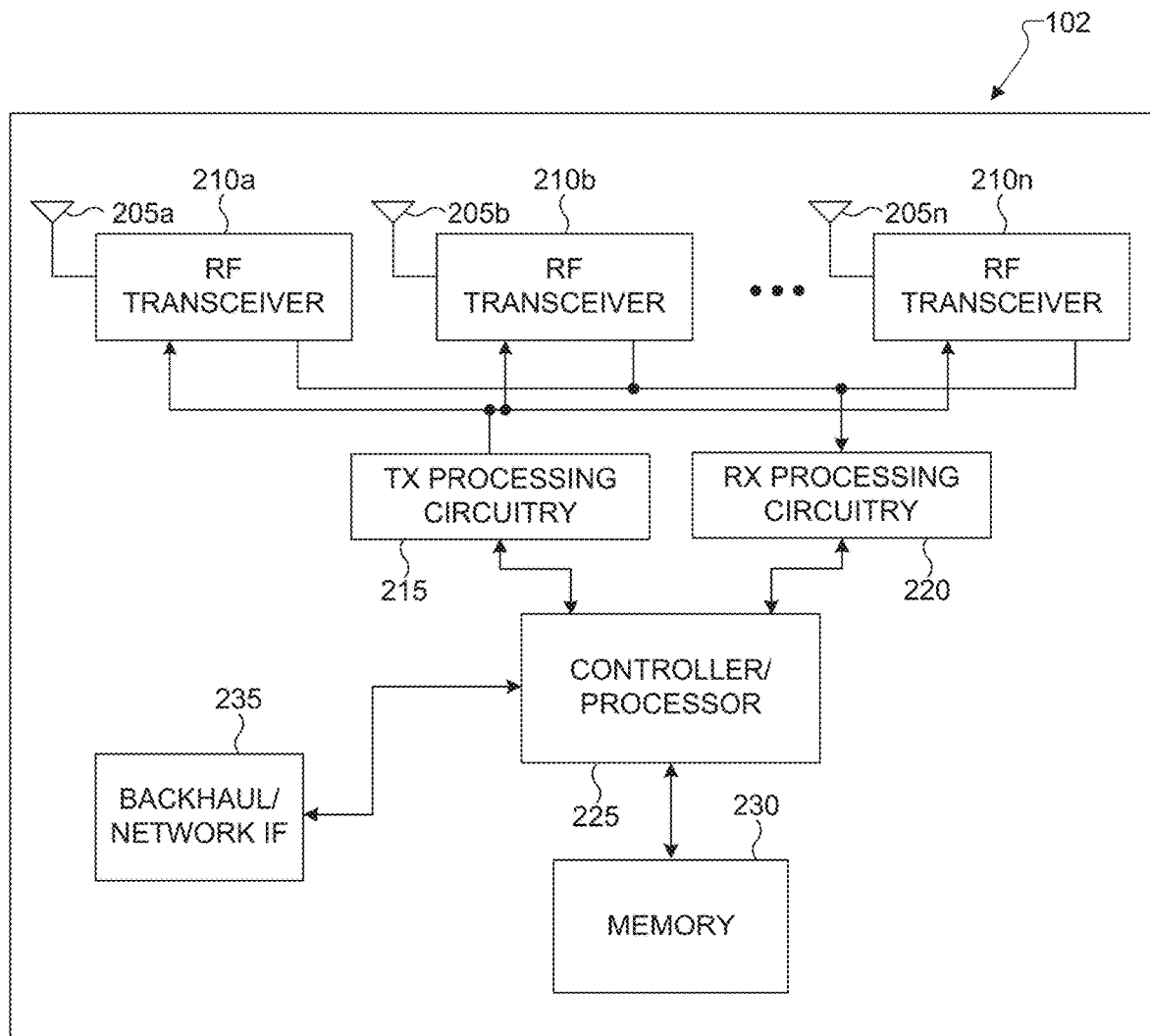
FIG. 2 illustrates an example gNB according to embodiments of the present disclosure.
Figure 3:
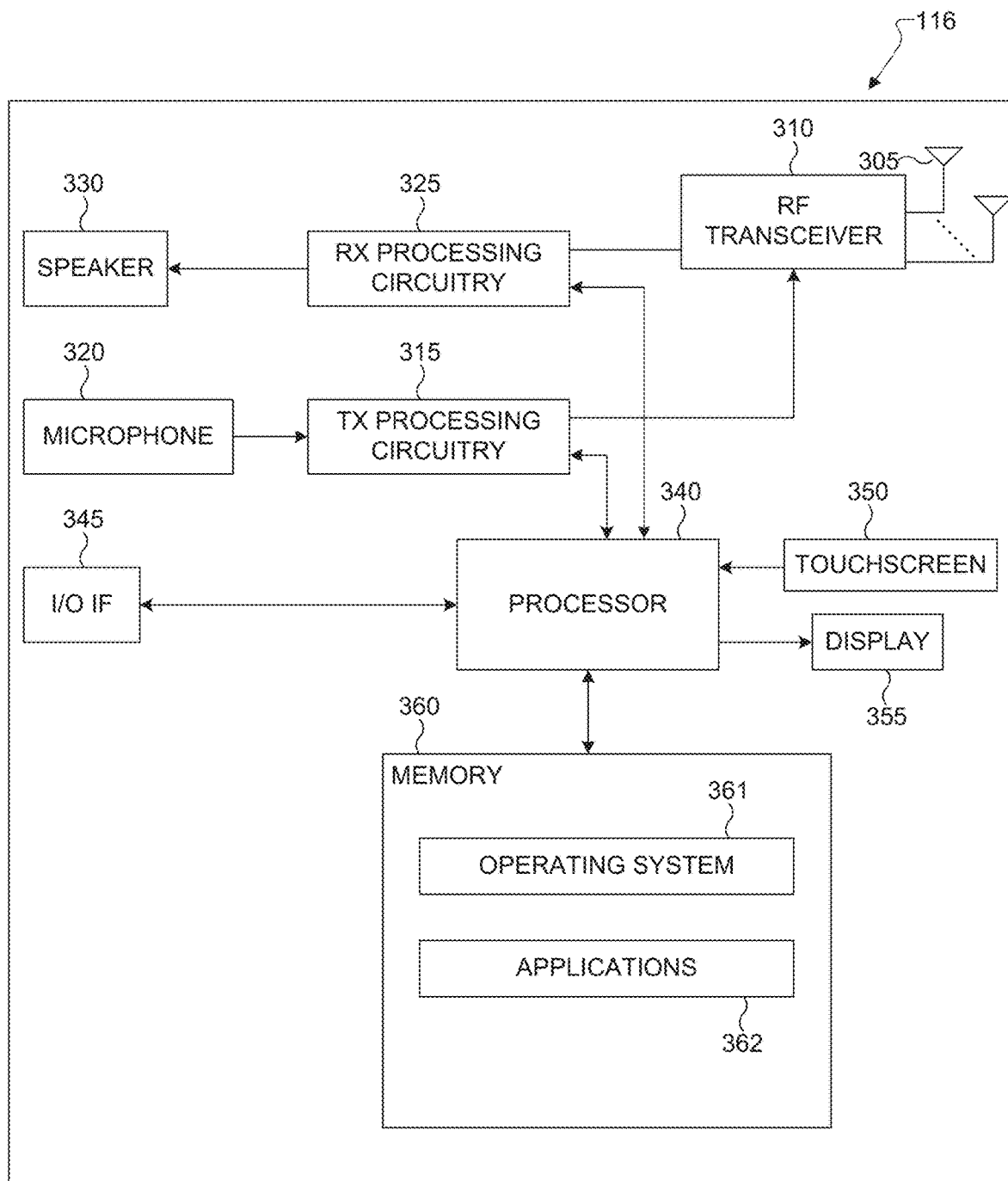
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for UE assistance information report for sidelink communication. In certain embodiments, and one or more of the gNBs 101-103 includes circuitry, programming, or a combination thereof, for beam management and coverage enhancements for sidelink measurements in V2X communication.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support the sidelink DRX operation. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a sidelink DRX operation. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
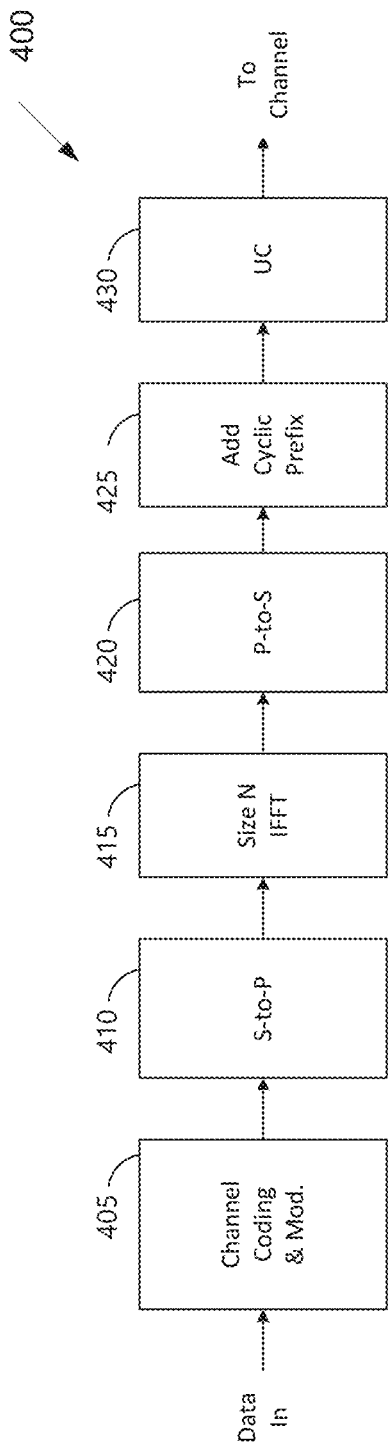
FIGS. 4 and 5 illustrate example wireless transmit and receive paths according to this disclosure.
Figure 5:
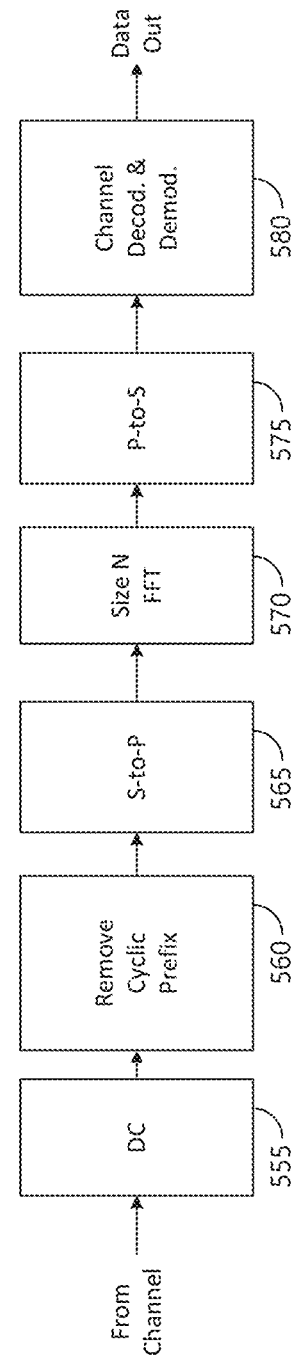

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support sidelink measurements in V2X communication as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In 3GPP wireless standards, NR has been being discussed as a 5G wireless communication. One of NR features under the discussion is V2X.

FIG. 6 illustrate an example V2X communication over sidelink 600 according to embodiments of the present disclosure. An embodiment of the V2X communication over sidelink 600 shown in FIG. 6 is for illustration only.

FIG. 6 illustrates an example scenario of vehicle to vehicle communication. Two or multiple vehicles can transmit and receive data/control over direct link/interface between vehicles. The direct link/interface between vehicles or between vehicle and other things is named as a sidelink (SL) in 3GPP. Note that the FIG. 6 describes the scenario where the vehicles still can communicate with a gNB in order to acquire SL resources, SL radio bearer configurations, etc., however it is also possible even without interaction with the gNB, vehicles still communicate each other over the SL. In the case, the SL resources, the SL radio bearer configurations, etc., are preconfigured (e.g., via V2X server or any other core network entity).

In 3GPP wireless standards, NR is discussed as 5G wireless communication. One of NR features under the discussion is vehicle-to-everything (V2X).

FIG. 6 illustrates an example V2X communication over sidelink 600 according to embodiments of the present disclosure. An embodiment of the V2X communication over sidelink 600 shown in FIG. 6 is for illustration only.

FIG. 6 describes the example scenario of vehicle to vehicle communication. Two or multiple vehicles can transmit and receive data/control over direct link/interface between vehicles. The direct link/interface between vehicles or between vehicle and other thing (e.g., pedestrian device or any device related to transportation system) or between other things is named as SL or PC5 in 3GPP standard.

FIG. 6 describes one example scenario where the vehicles communicate each other and the vehicles are located in in-coverage of NR network. Vehicles communicate with the gNB in order to acquire SL related resource information (e.g., SL resource pool configuration, etc.), SL radio bearer configurations (SL MAC, RLC, PDCP, SDAP, RRC related configurations), etc.

The vehicles transmit/receive the data/control each other over SL once the vehicles acquire SL related configurations from the gNB. It notes that it is also possible even without interaction with the gNB (e.g., vehicles are located in out-of-coverage of NR network), vehicles still communicate each other over SL. In the case, SL resources, SL radio bearer configuration, etc. are preconfigured (e.g., via V2X server or any other core network entity). For more detailed V2X scenarios and studies are captured in 3GPP standard specification.

For SL communication, the radio interface layer 1/layer 2/layer 3 (L1/L2/L3) protocols comprise, as specified in 3GPP standard specification, physical (PHY) protocol, MAC, RLC, PDCP, RRC, and SDAP.

FIG. 7A illustrates an SL control plane radio control (e.g., RRC) protocol stack 700. An embodiment of the SL control plane RRC protocol stack 700 shown in FIG. 7A is for illustration only.

FIG. 7B illustrates an SL user plane data radio protocol stack 750. An embodiment of the SL user plane data radio protocol stack 750 shown in FIG. 7B is for illustration only.

FIGS. 7A and 7B illustrate the example of SL control plane radio protocol stack (for SL-RRC) and SL user plane data radio protocol stack for NR SL communication.

SL control plane radio protocol stack (e.g., RRC) is illustrated in FIG. 7A and SL user plane data radio protocol stack is illustrated in FIG. 7B.

A physical protocol layer handles physical layer signals/channels and physical layer procedures (e.g., physical layer channel structures, physical layer signal encoding/decoding, SL power control procedure, SL CSI related procedure). Main physical SL channels and signals are defined as follow: (1) a PSCCH transmits SCI for the radio resource and/or other transmission parameters used by a UE for PSSCH. The SCI transmitted by PSCCH is also called as 1st-stage SCI.; (2) a PSSCH transmits also SCI (e.g., remaining part of SCI information that is other than the SCI carried by PSCCH) or the transport blocks (TBs) of data themselves and CSI feedback information, etc. The SCI transmitted by PSSCH is also called as 2nd-stage SCI.; (3) a physical sidelink feedback channel (PSFCH) transmits hybrid automatic repeat request (HARD) feedback over the sidelink from a UE which is an intended recipient of a PSSCH transmission to the UE which performed the transmission; (4) a sidelink synchronization signal includes sidelink primary and sidelink secondary synchronization signals (S-PSS, S-SSS); and (5) a physical sidelink broadcast channel (PSBCH) indicates the required essential system information for SL operations.

A MAC protocol layer performs packet filtering (e.g., determine whether the received packet is actually destined to the UE (based on the L2 source and destination ids in the MAC header), SL carrier/resource pool/resource within the resource pool (re)selection, priority handling between SL and UL for a given UE, SL logical channel prioritization, the corresponding packet multiplexing (e.g., multiplexing multiple MAC service data units (SDUs) into a given MAC protocol data unit (PDU)) and SL HARQ retransmissions/receptions.

An RLC protocol layer performs RLC SDU segmentation/SDU reassembly, re-segmentation of RLC SDU segments, error correction through ARQ (only for AM data transfer). PDCP protocol layer performs header compression/decompression, ciphering and/or integrity protection, duplication detection, re-ordering and in-order packet delivery to the upper layer and out-of-order packet delivery to the upper layer.

An RRC protocol layer performs transfer of a SL-RRC message between peer UEs, maintenance and release of SL-RRC connection between two UEs, and detection of SL radio link failure for a SL-RRC connection. SDAP protocol layer performs mapping between a quality of service (QoS) flow and a SL data radio bearer.

A sidelink control information format 1-A (SCI format 1-A) is used for the scheduling of PSSCH and $2^{nd}$-stage-SCI on PSSCH.

Following information is transmitted by means of the SCI format 1-A: (1) priority—3 bits as defined in 3GPP standard specification; (2) frequency resource assignment—

$$\left\lceil \log_2\left(\frac{N_{subChannel}^{SL}(N_{subChannel}^{SL}+1)}{2}\right) \right\rceil$$

bits when the value of the higher layer parameter sl-MaxNumPerReserve is configured to 2, otherwise $$\left\lceil \log_2\left(\frac{N_{subChannel}^{SL}(N_{subChannel}^{SL}+1)(2N_{subChannel}^{SL}+1)}{6}\right) \right\rceil$$

bits when the value of the higher layer parameter sl-MaxNumPerReserve is configured to 3, as defined in 3GPP standard specification; (3) time resource assignment—5 bits when the value of the higher layer parameter sl-MaxNumPerReserve is configured to 2, otherwise, 9 bits when the value of the higher layer parameter sl-MaxNumPerReserve is configured to 3, as defined in 3GPP standard specification; (4) a resource reservation period—[$\log_2 N_{rsv\_period}$] bits as defined in 3GPP standard specification, where $N_{rsv\_period}$ is the number of entries in the higher layer parameter sl-ResourceReservePeriodList, if higher layer parameter sl-MultiReserveResource is configured; 0 bit otherwise; (5) a DMRS pattern—[$\log_2 N_{pattern}$] bits as defined in 3GPP standard specification, where $N_{pattern}$ is the number of DMRS patterns configured by higher layer parameter sl-PSSCH-DMRS-TimePatternList; 0 bit if sl-PSFCH-DMRS-TimePatternList is not configured; (6) a $2^{nd}$-stage SCI format—2 bits as shown in TABLE 1; (7) a Beta_offset indicator—2 bits as provided by higher layer parameter sl-BetaOffsets2ndSCI and table as shown in TABLE 2; (8) a number of DMRS port—1 bit as defined in table as shown in TABLE 3; (9) a modulation and coding scheme—5 bits as defined in 3GPP standard specification; (10) an additional MCS table indicator—as defined in 3GPP standard specification: 1 bit if one MCS table is configured by higher layer parameter sl-Additional-MCS-Table; 2 bits if two MCS tables are configured by higher layer parameter sl-Additional-MCS-Table; 0 bit otherwise; (11) a PSFCH overhead indication—1 bit as defined in 3GPP standard specification, if higher layer parameter sl-PSFCH-Period=2 or 4; 0 bit otherwise; and/or (12) a reserved—a number of bits as determined by higher layer parameter sl-NumReservedBits, with value set to zero.

TABLE 1

$2^{nd}$-stage SCI formats

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 2

Mapping of Beta_offset indicator values to indexes

| Value of Beta_offset indicator | Beta_offset index |
|---|---|
| 00 | 1st index provided by higher layer parameter sl-BetaOffsets2ndSCI |
| 01 | 2nd index provided by higher layer parameter sl-BetaOffsets2ndSCI |
| 10 | 3rd index provided by higher layer parameter sl-BetaOffsets2ndSCI |
| 11 | 4th index provided by higher layer parameter sl-BetaOffsets2ndSCI |

TABLE 3

Number of DMRS port(s)

| Value of the Number of DMRS port field | Antenna ports |
|---|---|
| 0 | 1000 |
| 1 | 1000 and 1001 |

An SCI format 2-A is used for the decoding of PSSCH, with a HARQ operation when HARQ-ACK information includes ACK or NACK, or when there is no feedback of HARQ-ACK information.

Following information is transmitted by means of the SCI format 2-A: (1) an HARQ process number—[$\log_2 N_{process}$] bits as defined in 3GPP standard specification; (2) a new data indicator—1 bit as defined in 3GPP standard specification; (3) a redundancy version—2 bits as defined in 3GPP standard specification; (4) a source ID—8 bits as defined in 3GPP standard specification; (5) a destination ID—16 bits as defined in 3GPP standard specification; (6) an HARQ feedback enabled/disabled indicator—1 bit as defined in 3GPP standard specification; (7) a cast type indicator—2 bits as shown in TABLE 4; and/or (8) a CSI request—1 bit as defined in 3GPP standard specification.

TABLE 4

Cast type indicator

| Value of Cast type indicator | Cast type |
|---|---|
| 00 | Broadcast |
| 01 | Groupcast |
| 10 | Unicast |
| 11 | Reserved |

An SCI format 2-B is used for the decoding of PSSCH, with a HARQ operation when HARQ-ACK information includes only NACK, or when there is no feedback of HARQ-ACK information.

Following information is transmitted by means of the SCI format 2-B: (1) HARQ process number—[$\log_2 N_{process}$] bits as defined in 3GPP standard specification; (2) a new data indicator—1 bit as defined in 3GPP standard specification; (3) a redundancy version—2 bits as defined in 3GPP standard specification; (4) a source ID—8 bits as defined in 3GPP standard specification; (5) a destination ID—16 bits as defined in 3GPP standard specification; (6) an HARQ feedback enabled/disabled indicator—1 bit as defined in 3GPP standard specification; (7) a zone ID—12 bits as defined in 3GPP standard specification; and/or (8) communication range requirement—4 bits as defined in 3GPP standard specification.

In 3GPP standard specification Rel-16, the basic SL communication functionalities are supported and specified. For 3GPP standard specification Rel-17, it is planned to introduce more enhanced features into SL. One of features is to introduce SL DRX for broadcast, groupcast and unicast. It is noted that, in 3GPP standard specification Rel-16, a UE DRX operation is specified for DL only. Detailed DL DRX operation is specified in 3GPP standard specification (e.g., MAC).

In order to achieve SL DRX, one of example embodiments is TX UE includes new control information (it is called as DRX indicator from now on) into an SCI format 1-A indicating RX UE(s) skips monitoring of PSCCH and/or PSSCH for a source id, or a destination id or a combination of source id and destination id or a combination of SL logical channel id, source id and destination id until the time of the next resource(s) for transmission(s) indicated by Time resource assignment and/or Resource reservation period in SCI format 1-A.

This embodiment also includes the possibility that this DRX indicator can be included into either SCI format 2-A/2-B or newly defined SCI format (e.g., SCI format 3-A). From an RX UE(s) point of view, when the RX UE receives SCI in PSCCH and/or PSSCH (e.g., SCI format 1-A and SCI format 2-A/2-B) (e.g., assuming this time as T0) and if the SCI in PSCCH and/or PSSCH contains the DRX indicator and if the decoding of the associated PSSCH (at T0) for the data is failed (e.g., cyclic redundancy check (CRC)) results error), the RX UE(s) for a given source id, or destination id or a combination of source id and destination id or a combination of SL logical channel id, source id and destination id, may skip monitoring of SCI in PSCCH and/or PSSCH until the time of the next incoming resource indicated by time resource assignment (e.g., assuming the time of next incoming resource as T1). At T1, the UE may resume monitoring of SCI in PSCCH and/or PSSCH.

If RX UE(s) receives SCI in PSCCH and/or PSSCH (i.e., SCI format 1-A and SCI format 2-A/2-B, assuming this time as T0) and if the SCI in PSCCH and/or PSSCH contains the DRX indicator and if a resource reservation period is set as a non-zero value, the UE may skip monitoring of SCI in PSCCH and/or PSSCH until the time of the next resource indicated by the resource reservation period that received at T0 (e.g., assuming the time of the first resource after a resource reservation period as T2) if the decoding of the associated PSSCH for the data is successful or if no more resource for HARQ data retransmission is indicated by time resource assignment.

At T2, the UE may resume monitoring of SCI in PSCCH and/or PSSCH. The UE considers T2 as new T0 and the above described DRX operation may be iterated continuously. It is noted that a TX UE for a given source id, or destination id or combination of source id and destination id or combination of SL logical channel id, source id and destination id, does not transmit PSCCH and/or PSSCH in a time when RX UE(s) does not monitor PSCCH and/or PSSCH.

For more details, the provided DRX indicator can be signaled by using the current reserved bits in PSCCH SCI format 1-A but using other existing information field or defining new field is also possible options.

The aforementioned embodiment can be further extended in order for a TX UE to have more scheduling flexibilities for PSCCH and/or PSSCH transmissions. For example, in addition to the DRX indicator in the above new timers can be introduced in order for an RX UE(s) for a given source id, or destination id or a combination of source id and destination id or a combination of SL logical channel id, source id and destination id, to continue monitoring of PSCCH and/or PSSCH during some period that is restricted by the timer.

New timer N1 and/or N2 and/or M can be introduced. With new timers, an RX UE(s) can continue monitoring of SCI in PSCCH and/or PSSCH while the timer runs. Timer N1 is started when the RX UE(s) receives the first SCI in PSCCH and/or PSSCH for the first resource of the first new packet transmission (T0 in the above example) and the first SCI in PSCCH and/or PSSCH for the first resource of the first new packet transmission after Resource reservation period (T2 in the above example).

Timer N2 is started when the next resource, which was indicated by time resource assignment, comes available (e.g., T1 in the above example). Timer M is started or restarted (if the timer M was already started and runs) when the RX UE(s) receives SCI in PSCCH and/or PSSCH for another new packet transmission while N1 runs. RX UE(s) monitors SCI in PSCCH and/or PSSCH while any of timer (among N1, N2 and M) runs. Timers can be applied all together but it is also possible that only certain timer(s) can be applied.

A TX UE also needs to maintain the timers in the same manner as an RX UE(s) and the TX UE can have more freedom to schedule PSCCH and/or PSSCH transmissions while the timer runs. It is noted that whether SCI in PSCCH and/or PSSCH schedules for the new packet transmission or retransmission(s) can be determined based on new data indicator (NDI) in an SCI format 2-A or 2-B via PSCCH.

N1 and/or N2 and/or M can be set as integer value either equal to 0 or larger than 0, e.g., 0 [ms] or 5 [ms] or 10 [ms]. N1, N2, and M can be set as same or different values. N1, N2, and M can be configured by either dedicated RRC message (e.g., RRC connection reconfiguration)/common RRC message (e.g., system information), which provided by the gNB, or pre-configured. This embodiment also includes the possibility that the TX UE can determine N1, N2, and M value autonomously without gNB configuration or pre-configuration. For unicast communication case, SL DRX indicator/activation, N1, N2, and M values can be informed or negotiated via SL-RRC (PC5-RRC) directly between two associated UEs.

In another embodiment, a TX UE includes DRX related information into MAC CE which is transmitted over the associated PSSCH. The TX and RX UEs' operation according to the indicator indicating RX UE(s) skips monitoring of SCI in PSCCH and/or PSSCH for a source id, or destination id or a combination of source id and destination id or a combination of SL logical channel id, source id and destination id until the time of the next resource(s) for transmission(s) indicated by Time resource assignment and/or Resource reservation period in SCI format 1-A, N1, N2 and M is same as what described in the above first example embodiment. But the indicator and/or N1 and/or N2, and/or M are signaled as MAC CE which is transmitted over the associated PSSCH.

Figure 8:
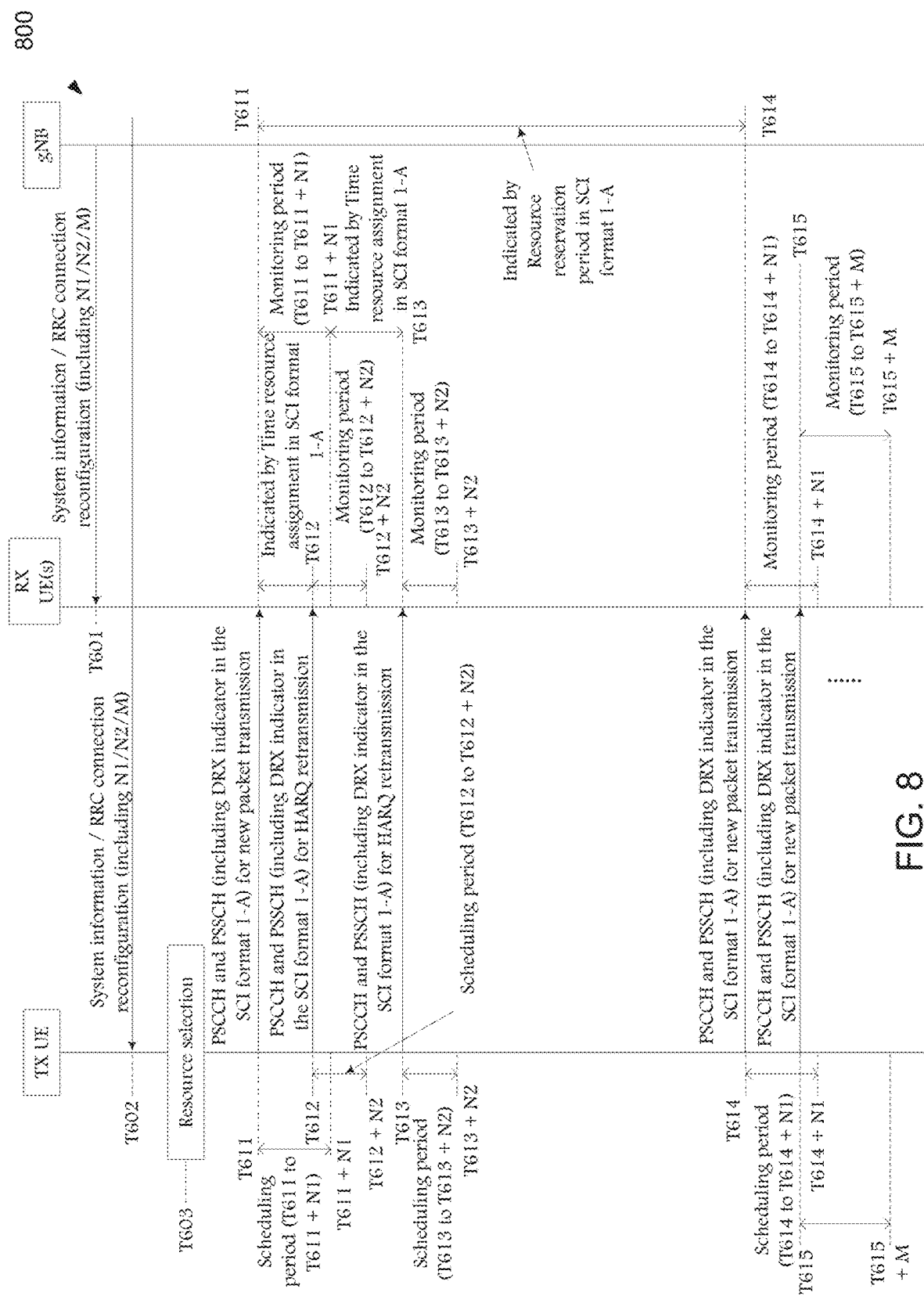
FIG. 8 illustrates a signaling flow for a sidelink DRX mechanism according to embodiments of the present disclosure.

FIG. 8 illustrates a signaling flow 800 for a sidelink DRX mechanism according to embodiments of the present disclosure. An embodiment of the signaling flow 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

FIG. 8 illustrates the signaling flows of the aforementioned embodiment according to the first example embodiment. T601 indicates RX UE(s) receives timers N1, N2 and M by dedicated RRC (RRC connection reconfiguration) or system information by the gNB. T602 indicates that a TX UE receives timers N1, N2 and M by dedicated RRC (RRC connection reconfiguration) or system information by the gNB. Note it is also possible that the RX UE or TX UE receives the parameters by pre-configuration. As illustrated in FIG. 8, the TX UE is a UE configured for SL transmission by the upper layer while RX UE is the UE configured for SL reception by the upper layer.

If the UE is configured for both SL transmission and SL reception by the upper layer, this UE can be a TX UE when the UE performs SL transmission and the UE can also be an RX UE when the UE performs SL reception. T603 indicates that the TX UE performs resource (re)selection procedure to allocate the resources for new data packet transmission and HARQ data retransmissions. As illustrated in FIG. 8, resource information for the initial transmission and two HARQ data retransmissions can be included into SCI in PSCCH and/or PSSCH. T611 indicates the time when the TX UE sends PSCCH and PSSCH for SCI and new data packet transmission (initial transmission).

An SCI format 1-A can include the DRX indicator by using the currently reserved bits in the SCI format 1-A. SCI in PSCCH and/or PSSCH includes the resource information in a time-domain for HARQ data retransmissions, which indicated by time resource assignment in the SCI format 1-A.

It is assumed that the TX UE applies SL DRX so the DRX indicator is included in the SCI format 1-A. From the RX UE point of view, if the RX UE receives SCI in PSCCH and/or PSSCH at T611, the UE becomes aware there is a DRX indicator in the SCI format 1-A and the SL DRX operation is applied. At T611, the RX UE(s) starts timer N1 and the UE monitors SCI in PSCCH and/or PSSCH while N1 runs (as illustrated in FIG. 8, the monitoring period is from T611 to (T611+N1)). The RX UE(s) can determine T612 timing based on the field, time resource assignment, in the SCI format 1-A that received at T611.

It can be simply decided by adding the duration indicated by time resource assignment into T611. The RX UE(s) starts or restarts (if a timer was already started and runs) timer N2 from T612 and the RX UE monitors SCI in PSCCH and/or PSSCH while N2 runs (as illustrated in FIG. 8, the monitoring period is from T612 to (T612+N2)). The RX UE(s) can also determine T613 timing based on the field, time resource assignment, in the SCI format 1-A that received at T612.

It can be simply decided by adding the duration indicated by time resource assignment into T612. The RX UE(s) starts or restarts (if a timer was already started and runs) timer N2 from T613 and the RX UE monitors SCI in PSCCH and/or PSSCH while N2 runs (as illustrated in FIG. 8, the monitoring period is from T613 to (T613 to N2)). The RX UE(s) can know there is no more resources for HARQ data retransmissions from PSCCH after T613 based on the field, time resource assignment, in the SCI format 1-A that received at T613.

As illustrated in FIG. 8, during the duration from T611 to (T613+N2), the RX UE(s) only monitors SCI in PSCCH and/or PSSCH during the period where any timer N1 or N2 or M runs (i.e., from T611 to (T611+N1), from T612 to (T612+N2), from T613 to (T613+N2)), otherwise the RX UE(s) skips monitoring of SCI in PSCCH and/or PSSCH. Once RX UE(s) know there is no more resources for HARQ data retransmission from PSCCH after T613 based on the field, time resource assignment, in the SCI format 1-A that received at T613, the UE skips monitoring of SCI in PSCCH and/or PSSCH until the time for the next first resource for new packet transmission at T614.

The RX UE(s) can determine T614 based on the field, a resource reservation period, in the SCI format 1-A that received at T611. It can be simply decided by adding the duration associated with resource reservation period into T611. As described above in T611, the RX UE(s) starts N1 at T614 and the RX UE monitors SCI in PSCCH and/or PSSCH while N1 runs.

As illustrated in FIG. 8, T615 indicates SCI in PSCCH and/or PSSCH schedules the resource for another new data packet transmission (initial transmission) after T614. If the RX UE(s) receives SCI in PSCCH and/or PSSCH that schedules the resource for another new data packet transmission (rather than the first new packet transmission (initial transmission) after resource reservation period, here T614) while N1 runs, the RX UE(s) starts or restarts (if a timer was already started and runs) timer M and the RX UE monitors SCI in PSCCH/PSSCH while M runs.

As illustrated in FIG. 8, the RX UE(s) monitors SCI in PSCCH and/or PSSCH while N1 runs and M runs (e.g., the duration from T614 to (T614+N1) and the duration from T615 to (T615+M)). It is noted that, from T614, HARQ data retransmissions are omitted just for simplicity. It is noted that, as illustrated in FIG. 8, it is assumed that all SCIs in PSCCH and/or PSSCH include a DRX indicator, otherwise the RX UE(s) does not follow the DRX operation explained in the above and instead the RX UE continuously monitors SCI in PSCCH and/or PSSCH in time.

With the DRX indicator, the RX UE(s) monitors SCI in PSCCH and/or PSSCH only while any of timers (N1, N2, and M) runs, otherwise the RX UE skips monitoring of SCI in PSCCH and/or PSSCH. Likewise, the TX UE also maintains these timers in the same manner as RX UE(s) and the TX UE can transmit PSCCH and/or PSSCH while any of timers (N1, N2 and M) runs. In T601 and T602, additional parameter default interval T may be signaled to the UE. Default interval T can be used when resource reservation interval is not included in SCI in PSCCH and/or PSSCH. For example, if resource reservation interval is not included in SCI in PSCCH and/or PSSCH in T611, T614 is derived from (T611+default interval T).

Figure 9A:
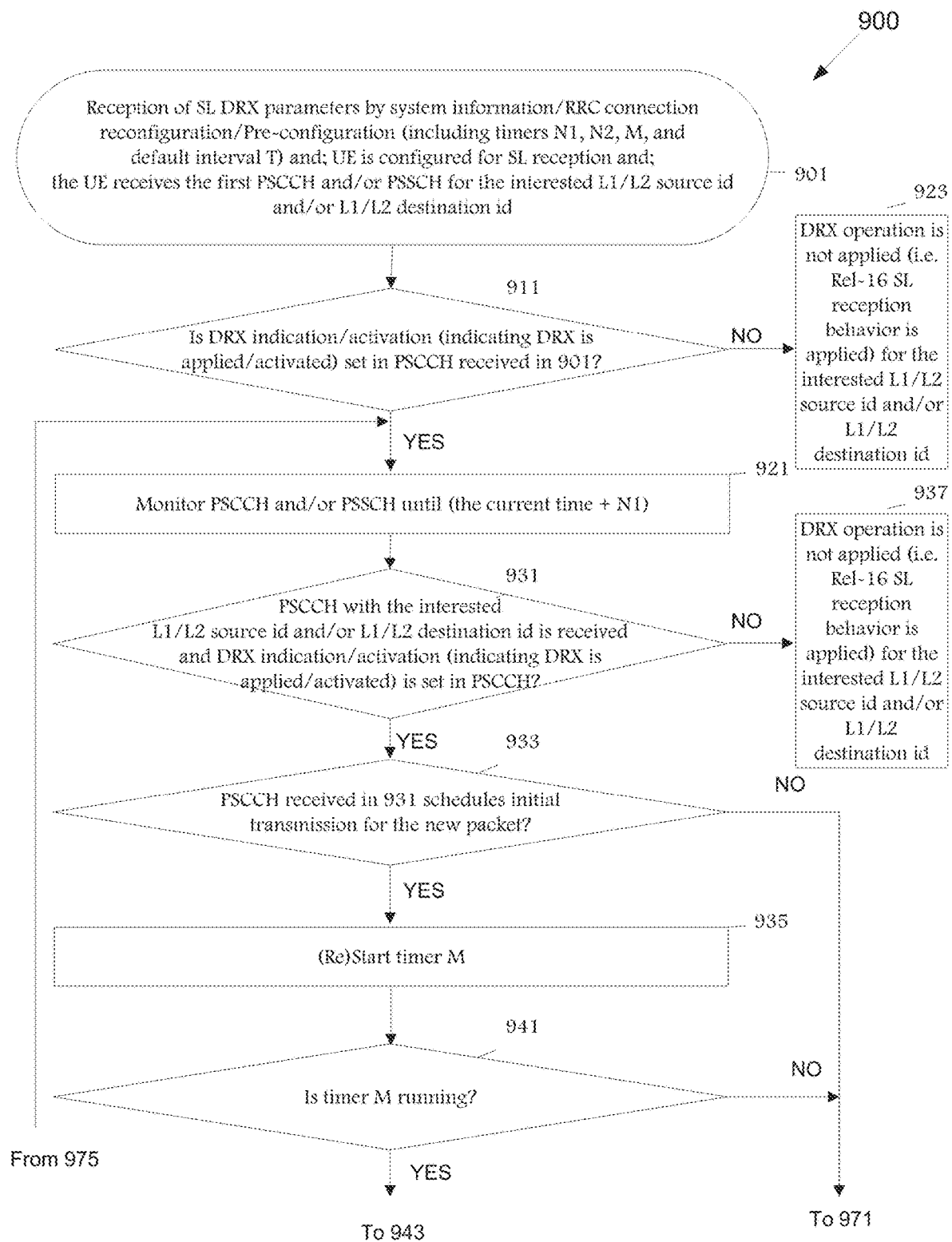
FIG. 9A illustrates a flowchart of a method for RX UE behavior according to embodiments of the present disclosure.

FIG. 9A illustrates a flowchart of a method 900 for RX UE behavior according to embodiments of the present disclosure. The method 900 as may be performed by a UE (e.g., 111-116 as illustrated in FIG. 1. An embodiment of the method 900 shown in FIG. 9A is for illustration only. One or more of the components illustrated in FIG. 9A can be implemented in specialized circuitry configured to perform the noted functions or one or more of the components can be implemented by one or more processors executing instructions to perform the noted functions.

Figure 9B:
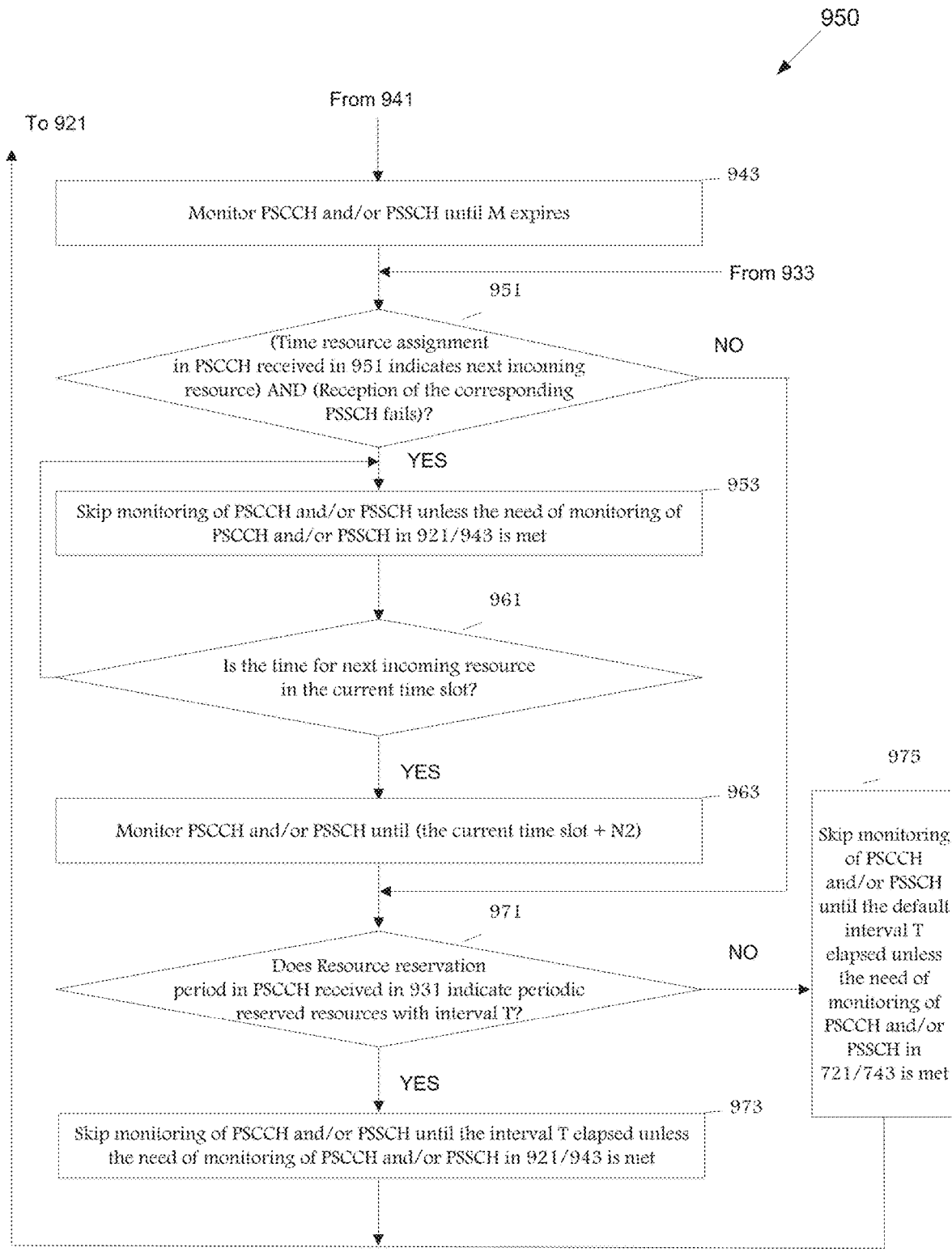
FIG. 9B illustrates a flowchart of a method for RX UE behavior according to embodiments of the present disclosure.

FIG. 9B illustrates another flowchart of a method 950 for RX UE behavior according to embodiments of the present disclosure. The method 950 as may be performed by a UE (e.g., 111-116 as illustrated in FIG. 1. An embodiment of the method 950 shown in FIG. 9B is for illustration only. One or more of the components illustrated in FIG. 9B can be implemented in specialized circuitry configured to perform the noted functions or one or more of the components can be implemented by one or more processors executing instructions to perform the noted functions.

In FIGS. 9A and 9B, RX UE behaviors are described. In step 901, the UE receives SL DRX parameters using system information/RRC dedicated message (e.g., RRC connection reconfiguration)/pre-configuration. Timer N1, N2, M and default interval T are included. Also in step 901, the UE is configured for SL reception and the UE receives the first SCI in PSCCH and/or PSSCH for the interested L1/L2 source id and/or L1/L2 destination id. Then the UE checks if a DRX indication/activation indicating DRX is applied/activated set in SCI in PSCCH and/or PSSCH received in step 901 (e.g., also step 911).

If the DRX indication/activation was set in step 911, the UE monitors SCI in PSCCH and/or PSSCH until (the current time+N1) in step 921. If the DRX indication/activation was not set in step 911, the DRX operation is not applied (i.e., 3GPP standard specification Rel-16 SL reception behavior is applied) for the interested L1/L2 source id and/or L1/L2 destination id in step 923.

During the monitoring of SCI in PSCCH and/or PSSCH in step 921, if the UE receives SCI in PSCCH and/or PSSCH with the interested L1/L2 source id and/or L1/L2 destination id and the DRX indication/activation indicating DRX is applied/activated is set in the SCI (step 931) and if this SCI schedules initial data transmission (not for HARQ data retransmission) for the new data packet (step 933), the UE (re)starts timer M (the UE restarts M if M was already started and M is running) (step 935) and the UE monitors SCI in PSCCH and/or PSSCH until M expires (step 943).

During the monitoring of SCI in PSCCH and/or PSSCH in step 921, if the UE receives SCI in PSCCH and/or PSSCH with the interested L1/L2 source id and/or L1/L2 destination id but DRX indication/activation indicating DRX is applied/ activated is not set in the SCI (step 931), the UE does not apply DRX operation (i.e., 3GPP standard specification Rel-16 SL reception behavior is applied) for the interested L1/L2 source id and/or L1/L2 destination id (step 937).

If time resource assignment in the SCI in PSCCH and/or PSSCH received in step 931 indicates next incoming resource and the UE fails reception of the corresponding PSSCH for the data (PSSCH CRC check is fails) (step 951), the UE skips monitoring of SCI in PSCCH and/or PSSCH until the time for the next incoming resource indicated by time resource assignment becomes the current time slot unless the need of monitoring of SCI in PSCCH and/or PSSCH in step 921 or step 943 is met (e.g., step 953, 961). If the time for the next incoming resource indicated by time resource assignment is the current time slot (e.g., step 961), the UE monitors SCI in PSCCH and/or PSSCH until (the current time slot+N2) (e.g., step 963).

If the UE successfully receives the corresponding PSCCH and/or PSSCH for HARQ data retransmission before the time by (the current time slot+N2), the UE does not need to monitor SCI in PSCCH and/or PSSCH in the remaining time. If a resource reservation period in SCI in PSCCH and/or PSSCH received in step 931 indicates periodic reserved resources with interval T (e.g., step 971), the UE skips monitoring of SCI in PSCCH and/or PSSCH until the interval T elapsed unless the need of monitoring of SCI in PSCCH and/or PSSCH in step 921 or step 943 is met (step 973). If the resource reservation period is not included in SCI in PSCCH and/or PSSCH received in step 931 (e.g., step 971), the UE skips monitoring of SCI in PSCCH and/or PSSCH until the default interval T elapsed unless monitoring of SCI in PSCCH and/or PSSCH in step 921 or step 943 is met (e.g., step 975). Instead of using default interval T in step 975, another possibility is not to apply DRX operation (i.e., 3GPP standard specification Rel-16 SL reception behavior is applied). After interval T is elapsed in steps 973 and 975, the UE goes to step 921.

A TX UE behavior is quite similar to an RX UE behavior in terms of handling of timers and determination of active time of PSCCH and/or PSSCH. Here are few differences compared to the RX UE behaviors. In one example, in step 901, the UE is configured for SL transmission (instead of SL reception). In another example, in step 933 and 935, the UE (re)starts timer M not only at the reception of SCI in PSCCH and/or PSSCH but also at the transmission of its own SCI in PSCCH and/or PSSCH.

The UE performs a resource selection operation for SL in advance before actual PSCCH and/or PSSCH transmission. The UE selects the resource within the period satisfying the RX UE's SCI in PSCCH and/or PSSCH monitoring time duration in steps 921 and 943.

Figure 10:
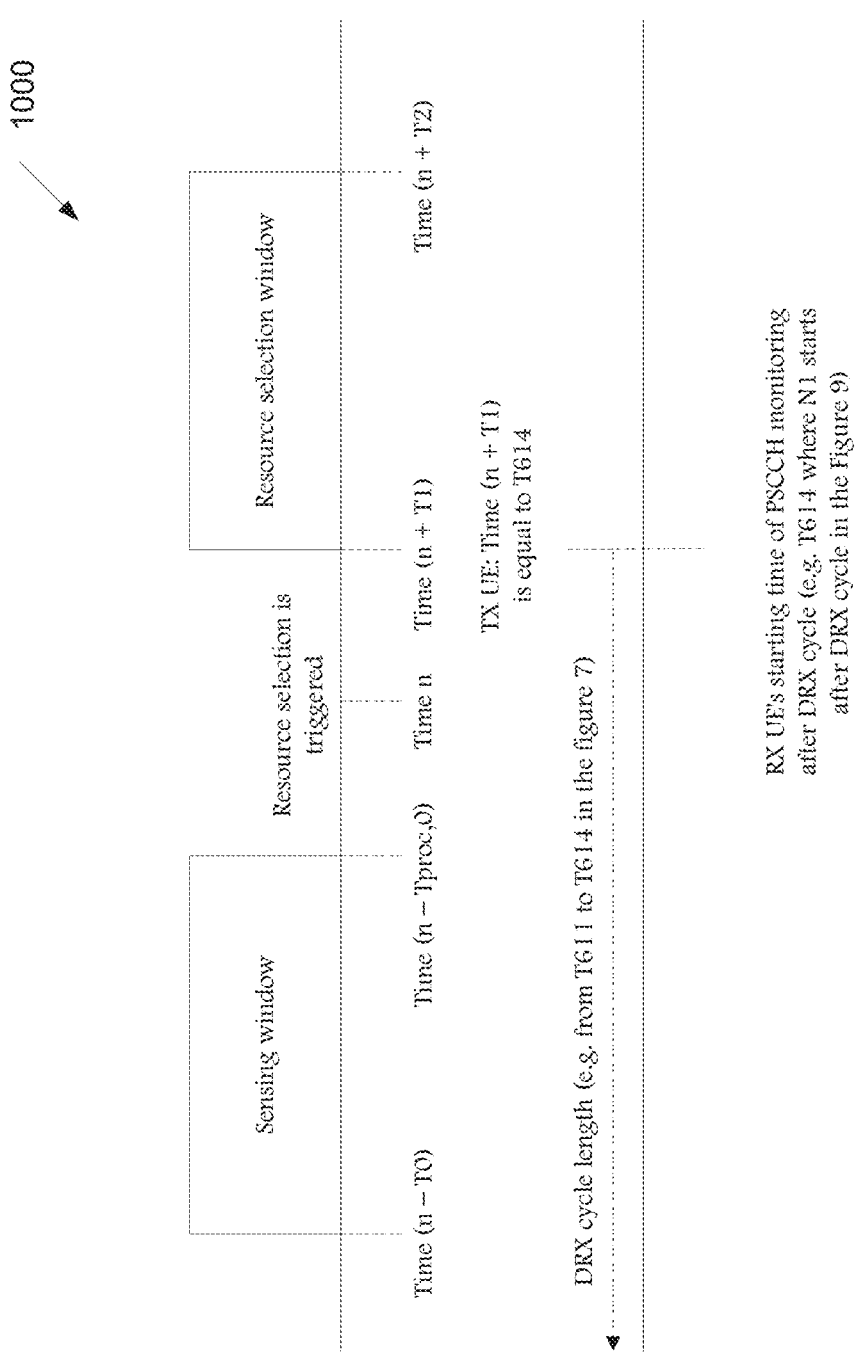
FIG. 10 illustrates an example TX UE's resource selection for SL DRX according to embodiments of the present disclosure.

FIG. 10 illustrates an example TX UE's resource selection for SL DRX 1000 according to embodiments of the present disclosure. An embodiment of the TX UE's resource selection for SL DRX 1000 shown in FIG. 10 is for illustration only.

FIG. 10 describes how a TX UE can perform resource selection for SL transmission. Resource selection has two steps. It may be assumed that a UE triggers resource selection at Time n. First, the UE performs channel sensing during the sensing window in order to find out observed available SL channels. Channel sensing is actually performed in advance than Time n (e.g., sensing window is from Time (n−T0) to Time (n−Tproc,0)). Then during the resource selection window, the UE selects the actual resource(s) for transmission among the observed available SL channels.

For example, a resource selection window is from time (n+T1) to time (n+T2). In order to guarantee that the selected resource is located within the wake-up period the RX UE(s) monitors SCI in PSCCH and/or PSSCH described in steps 921 and 943, TX UE makes sure that the resource selection window starts at the time (e.g., slot/subframe/frame number #X) when the RX UE(s) starts monitoring of SCI in PSCCH and/or PSSCH after DRX cycle and the resource selection window ends at the time (e.g., slot/subframe/frame number #Y) that is the last time RX UE(s) monitors SCI in PSCCH and/or PSSCH so RX UE(s) ends monitoring of SCI in PSCCH and/or PSSCH after that time.

For example, after DRX cycle (e.g., from T611 to T614 as illustrated in FIG. 9), the RX UE(s) starts monitoring of SCI in PSCCH and/or PSSCH (where N1 starts after DRX cycle) at T614, so the TX UE places the resource selection window starting from T614 (i.e., time (n+T1) is considered as equal to T614). This means that the TX UE may perform channel sensing in advance before T614. And the TX UE does not place any part of the resource selection window after the time (T615+M) that is the last time RX UE(s) monitors SCI in PSCCH and/or PSSCH so RX UE(s) ends monitoring of SCI in PSCCH and/or PSSCH after that time. The sensing window starts according to the assumption resource selection window starts at T614, and possibly moves towards (T615+M) as the resource selection window moves towards (T615+M), but the resource selection window may not pass beyond (T615+M), which means any part of the resource selection window cannot be placed after (T615+M) and correspondingly the sensing window may stop when the resource selection window stops.

To summarize, the resource selection window starts at the slot/subframe where the RX UE(s) starts monitoring of SCI in PSCCH and/or PSSCH (e.g., slot/subframe where long DRX cycle starts, on-duration timer starts, and HARQ RTT expires), moves towards until the slot/frame where the RX UE(s) monitors SCI in PSCCH and/or PSSCH lastly and the RX UE(s) ends monitoring of SCI in PSCCH and/or PSSCH after that slot/frame (e.g., slot/subframe where in-activity timer expires and HARQ retransmission timer expires), and stops if the end of the resource selection window (n+T2) comes to the slot/frame where the RX UE(s) monitors SCI in PSCCH and/or PSSCH lastly and the RX UE(s) ends monitoring of SCI in PSCCH and/or PSSCH after that slot/frame (e.g., slot/subframe where SL DRX in-activity timer expires and HARQ data retransmission timer expires). The sensing window may start according to the start of the resource selection window, move as the resource selection window moves, and stop when the resource selection window stops. In 3GPP standard specification, the concepts of slot/subframe where long DRX cycle starts, DRX on-duration timer, DRX HARQ RTT, DRX in-activity timer and DRX HARQ retransmission timer are described.

In the aforementioned descriptions/embodiments, it was assumed that an RX UE's DRX and/or a TX UE's corresponding discontinuous transmission (DTX) operates per SL link(s) for a given source id (L1/L2 source TX UE id), or destination id (L1/L2 destination RX UE/Group id), or combination of source id and destination id, or a combination of SL logical channel id, source id and destination id.

For example, if DRX operates per SL link for a given source id, for SL link(s) with the source id #A one DRX operation is performed in a RX UE and for SL link(s) with the source id #B another DRX operation is performed in that RX UE. It means different DRX may operate for SL link(s) if source id (L1/L2 TX UE id), or destination id (L1/L2 destination RX UE/Group id) or combination of source id and destination id, or a combination of SL logical channel id, source id and destination id is different. As another example, the RX UE's DRX and/or TX UE's corresponding DTX can operates in different manner dependent on the SL cast type.

For instance, if the SL link is an SL unicast, the RX UE's DRX and/or the TX UE's corresponding DTX operates per SL link(s) for a given source id while if the SL link is an SL groupcast or broadcast, the RX UE's DRX and/or the TX UE's corresponding DTX operates per SL link(s) for a given destination id. This is because in general, the DRX operation has quite relation to the traffic pattern generated in the TX UE so it makes sense that the DRX operates per source TX UE. This principle is well applied to an SL unicast, however for SL groupcast/broadcast considering many UEs can be TX UEs (e.g., group members) if this principle is kept for SL groupcast/broadcast, it may bring more UE power consumption issue due to many independent active times.

Since all member UEs share same application and most likely similar traffic pattern (or QoS level) in the groupcast/broadcast with the same destination id, it would be more desirable that the DRX operates per destination id in the SL groupcast/broadcast. It is noted that although DRX in the RX UE (and/or corresponding DTX in TX UE) operates per SL link(s) with a given source id if the SL link is SL uncast and DRX (and/or DTX) operates per SL link(s) with a given destination id if SL link is SL groupcast/broadcast, any other combination is also possible in this embodiment.

A MAC protocol layer performs packet filtering operation (e.g., determining whether the received packet is actually destined to the UE (based on the L2 source and destination ids in the MAC header), SL carrier/resource pool/resource within the resource pool (re)selection, priority handling between SL and UL (Uplink) for a given UE, SL logical channel prioritization, the corresponding packet multiplexing (e.g., multiplexing multiple MAC SDUs into a given MAC PDU) and SL HARQ retransmissions/receptions.

An RLC protocol layer performs RLC SDU segmentation/SDU reassembly, re-segmentation of RLC SDU segments, error correction through ARQ (only for AM data transfer).

A PDCP protocol layer performs header compression/decompression, ciphering and/or integrity protection, duplication detection, re-ordering and in-order packet delivery to the upper layer and out-of-order packet delivery to the upper layer. RRC protocol layer performs transfer of a SL-RRC message, which is also named as PC5-RRC, between peer UEs, maintenance and release of SL-RRC connection between two UEs, and detection of SL radio link failure for a SL-RRC connection. SDAP protocol layer performs mapping between a QoS flow and an SL data radio bearer. It is noted that the term of SL-RRC or PC5-RRC is used in the present disclosure.

SCI on PSCCH includes two SCI formats. The $1^{st}$ stage SCI format is an SCI format 1-A and the $2^{nd}$ stage SCI format is a SCI format 2-A and/or SCI format 2-B. Each SCI format has the following information. For more details, as described in 3GPP standard specification (e.g., NR multiplexing and channel coding, and NR physical layer procedures for data).

In 3GPP standard specification Rel-16, the basic SL communication functionalities are supported and specified. For 3GPP standard specification Rel-17, it is planned to introduce more enhanced features into SL and one of them is to introduce an SL DRX operation. It is noted that, in 3GPP standard specification Rel-16, a UE DRX operation is specified for DL only and detailed a DL DRX operation is specified in 3GPP standard specification (e.g., MAC).

There are some differences between SL and DL, which need to be considered in the introduction of SL DRX. One example is characteristic of the UE's layer 1 (L1) id, which is used to identify whether the DL or SL scheduling information transmitted via PDCCH for DL case and PSCCH and PSSCH for SL case. In DL, the UE's L1 id is same as UE's layer 2 (L2) id that is named as cell-radio network temporary identifier (C-RNTI) and the C-RNTI is assigned by the serving gNB.

The gNB assigns a unique C-RNTI value to RRC of the gNB connected a UE in a cell, e.g., UE #1 and UE #2 under the same serving cell do not have same C-RNTI value. Once C-RNTI is assigned, the UE determines whether the received scheduling information transmitted via PDCCH, which is also called as downlink control information (DCI), is for itself or other UEs by using own C-RNTI. If the own C-RNTI information is included in the successful CRC of the scheduling information, the UE determines the scheduling information is for itself so the UE follows DL/UL resource allocation or other commands in the scheduling information, otherwise the UE ignores it. However, in SL the UE's SL L1 id is not same as UE's SL L2 id that is named as SL L2 source id/destination id and SL L2 source id/destination id is assigned by the UE's upper layer, e.g., V2X layer or application layer.

Because of long length of SL L2 source id/destination id, SL L1 id is part of SL L2 source id/destination id, e.g., SL L1 source id/destination id is N most significant bits (MSB) or least significant bits (LSB) of SL L2 source id/destination id. It is noted that, in the scheduling information in PSCCH (for the first SCI) and PSSCH (for the second SCI), which is also called as sidelink control information (SCI), both SL L1 source id and destination id are included (in the second SCI in PSSCH).

In a TX UE point of view, the UE includes own SL L1 source id into SL L1 source id in the SCI and peer UE's SL L1 source id into SL L1 destination id in the SCI. In an RX UE point of view, the UE determines whether the received SCI is for itself or other UEs by using own SL L1 source id. If the own SL L1 source id is included as SL L1 destination id in the received SCI, the UE determines the scheduling information is for itself so the UE follows SL resource allocation or other commands in the SCI, e.g., the RX UE receives the data in the assigned SL resource in the SCI, otherwise the UE ignores it.

However, although the RX UE's SL L1 source id is included as SL L1 destination id in the received SCI, it actually does not guarantee that the received SCI is for the UE since SL L1 source id/destination id is not unique for each UE, e.g., for the case UE #1 and UE #2 have same N MSB/LSB value that is used as SL L1 id although the UE #1 and UE #2 have different value in the remaining bits of L2 source id/destination id. Thus, the UE finally checks whether the received data in the assigned SL resource by the SCI is for itself or other UEs after MAC decoding since full length of SL L2 source id/destination id is/are included in the MAC PDU header (HD). If the RX UE checks SL L2 destination id in the MAC HD is matched with own SL L2 source id, the UE continues further processing of MAC PDU and forwards the Mac PDU to the upper layer, otherwise the UE ignores the received data.

In one embodiment, a mechanism for SL DRX timer maintenance to address the characteristics of the UE's SL L1 id and SL L2 id(s) described.

Figure 11:
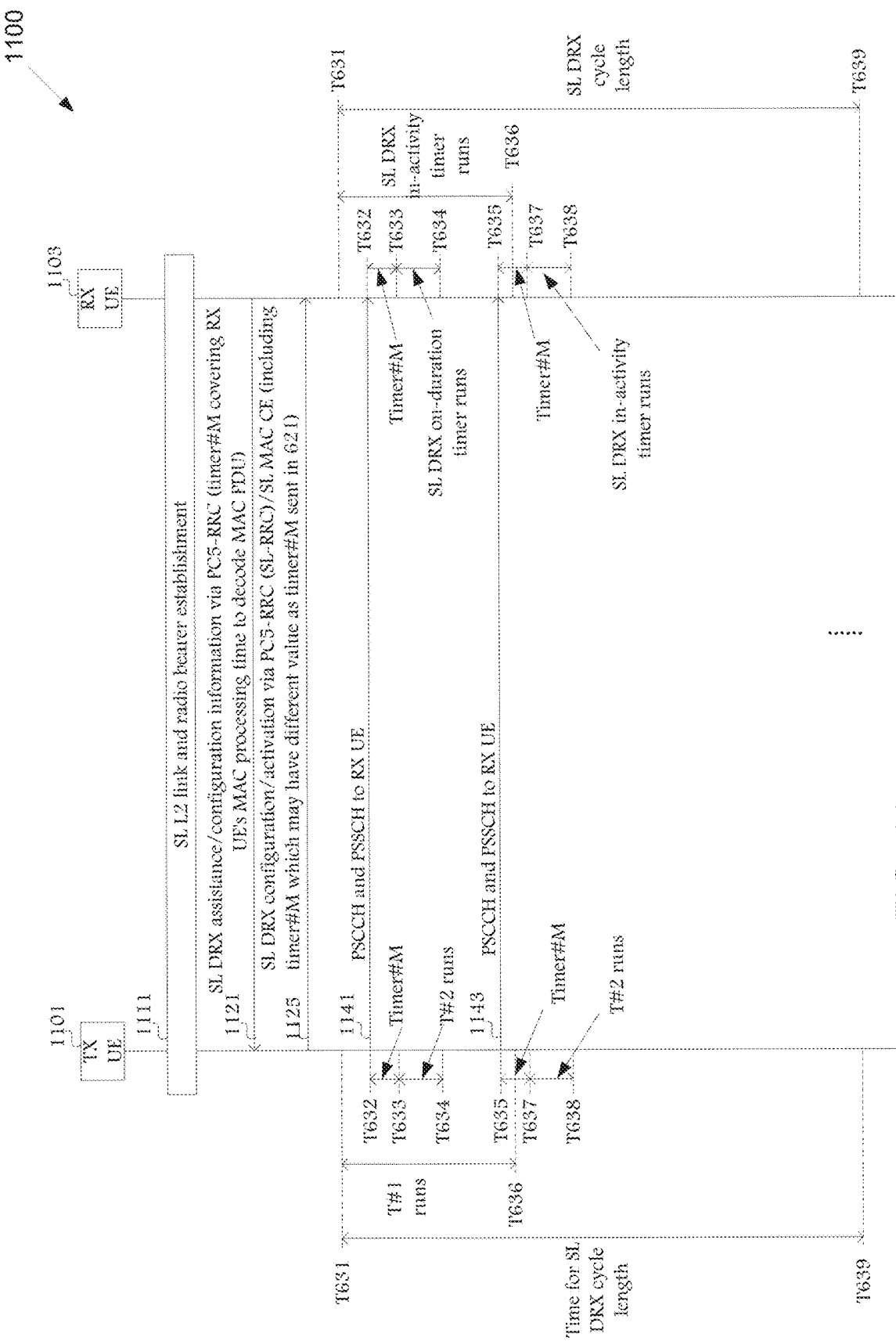
FIG. 11 illustrates a signaling flow for SL DRX in-activity timer maintenance according to embodiments of the present disclosure.

FIG. 11 illustrates a signaling flow 1100 for SL DRX in-activity timer maintenance according to embodiments of the present disclosure. An embodiment of the signaling flow 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

As illustrated in FIG. 11, a TX UE (1101), which is configured to transmit control and data to the certain RX UE (1103). As illustrated in FIG. 11, it is assumed that SL unicast data transmission and reception between the TX UE and the RX UE, however it does not exclude SL groupcast data transmission and reception. In the case of SL groupcast data, the RX UE can be multiple ones. The TX UE and the RX UE perform SL L2 link and radio bearer establishment (1111). The purpose of SL L2 link and radio bearer establishment is to exchange UE's context information, SL service information, etc. and to establish the corresponding radio bearers between two UEs. Once SL L2 link and radio bearers are established between the TX UE and the RX UE, the RX UE can send SL DRX related assistance/configuration information to the TX UE via PC5-RRC (SL-RRC) (in step 1121).

It includes timer #M that covers the time duration between the reception of PSSCH (including the data packet) and the decoding of MAC PDU in order to get full length of L2 source id/destination id from MAC HD. In one example, the timer #M can cover only MAC processing time to decode MAC PDU. Once the TX UE receives (1121), the TX UE can send SL DRX configuration or SL DRX activation via PC5-RRC or SL MAC CE (in step 1125).

The SL DRX configuration is set to consider the traffic pattern and/or QoS in the TX UE side and SL DRX assistance information received (in step 1121). The SL DRX configuration in 1125 may include timer #M which may have different value as timer #M sent in step 1121. It is noted that, in the FIG. 6, it is assumed that the RX UE provides the SL DRX related assistance information (including timer #M and RX UE's possible traffic pattern if the RX UE also has some data to transmit) to the TX UE and the TX UE finally sets the SL DRX configurations and provides the SL DRX configurations to the RX UE.

However, it is also possible that the TX UE provides the SL DRX related assistance information to the RX UE and the RX UE finally sets the SL DRX configurations and provides the SL DRX configurations to the TX UE. In the second case, before step 1121, there would be signaling from the TX UE on SL DRX assistance information via PC5-RRC (including the traffic pattern or suggested DRX configurations from the TX UE) and step 1121 would be SL DRX configuration information (including DRX cycle length, DRX offset to start the first DRX on-duration timer, DRX inactivity timer and timer #M) (rather than SL DRX assistance information) via PC5-RRC.

After step 1125, it may be assumed that the SL DRX started and the first SL DRX on-duration timer started at T631 (Time instance #631) from the RX UE. It is noted that DRX is defined from the RX UE point of view (for discontinuous reception operation), but similar timers need to be maintained also in the TX UE point of view in order to synchronize the control/data transmission time in the TX UE and the control/data reception time in the RX UE, otherwise the RX UE may miss the control/data sent by the TX UE. So, at T631, the RX UE starts SL DRX on-duration timer and the TX UE starts T #1 (Timer #1) that corresponds to the SL DRX on-duration timer length.

It is noted that, as illustrated in FIG. 11, the role of SL DRX on-duration timer, SL DRX cycle length and SL DRX in-activity timer are quite similar to DL DRX on-duration timer, DL DRX cycle length and DL DRX in-activity timer, which are defined in 3GPP standard specification. The difference of SL DRX on-duration timer and SL DRX in-activity timer compared to DL DRX on-duration timer and DL DRX in-activity timer is the RX UE monitors both PSCCH and PSSCH during the timer runs meanwhile for DL DRX, the UE only monitors PDCCH during the timer runs. The reason of the difference is for SL case, the scheduling information (SCI) is carried from both PSCCH (for the first SCI) and PSSCH (for the second SCI) meanwhile for DL, the scheduling information (e.g., DCI) is only carried via PDCCH.

As illustrated in FIG. 11, it is assumed that the first SL DRX on-duration timer starts at T631 and expires at T636 in the RX UE and correspondingly T #1 starts at T631 and expires at T636 in the TX UE. It may be assumed that the TX UE sends PSCCH and PSSCH to the RX UE at T632 (1141). Note the PSCCH and PSSCH in step 1141 (also in 1143) is only for an initial transmission (not for HARQ retransmissions). In the RX UE side, once signals in step 1141 are received, the RX UE starts timer #M at T632 (or at the next slot of T632) and if the RX UE checks the full length of SL L2 destination id included in the MAC HD matches to own SL L2 source id, then when T632 expires at T633 the RX UE start or restarts (if a timer was already started) SL DRX in-activity timer at T633, otherwise the RX UE does not start or restart (if a timer was already started) SL DRX in-activity timer at T633.

Correspondingly in the TX UE side, once signals in step 1141 are transmitted, the TX UE starts timer #M at T632 (or at the next slot of T632) and then when T632 expires at T633 the TX UE start or restarts (if a timer was already started) T #2 (Timer #2) that corresponds to SL DRX in-activity timer in the RX UE side. It is assumed that T #2 in the TX UE and SL DRX in-activity timer expires at T634.

In the RX UE side, if any of SL DRX on-duration timer and SL DRX in-activity timer runs, the RX UE monitors PSCCH and PSSCH to check if there is any scheduling information (i.e., the first SCI in the PSCCH and the second SCI in the PSSCH) for the RX UE. Otherwise, if none of SL DRX on-duration timer and SL DRX in-activity timer runs, the RX UE does not monitor PSCCH and PSSCH to check if there is any scheduling information (i.e., the first SCI in the PSCCH and the second SCI in the PSSCH) for the RX UE.

In the TX UE side, if any of T #1 and T #2 runs, the TX UE can send further PSCCH and PSSCH (SCIs in PSCCH and PSSCH, and data in PSSCH) to the RX UE. Otherwise, if none of T #1 and T #2 runs, the TX UE cannot send further PSCCH and PSSCH (SCIs in PSCCH and PSSCH, and data in PSSCH) to the RX UE. Note timer #M at T632 and T635 is same as the timer #M in 625 if 625 included timer #M, otherwise if timer #M was only included in 621, timer #M is same as the timer #M in 621.

As illustrated in FIG. 11, it is assumed that only SL DRX on-duration timer and SL DRX in-activity timer as SL DRX active time, which means the time duration that the RX UE monitors PSCCH and PSSCH to receive SCI and data that destined to the RX UE and that the TX UE can send further PSCCH and PSSCH for SCI and data to the RX UE, however it does not exclude other SL DRX active time, e.g., when a HARQ retransmission timer runs, etc. After SL DRX cycle length from T631, the SL DRX on-duration timer is started again in the RX UE side and T #1 is started again in the TX UE side.

Figure 12:
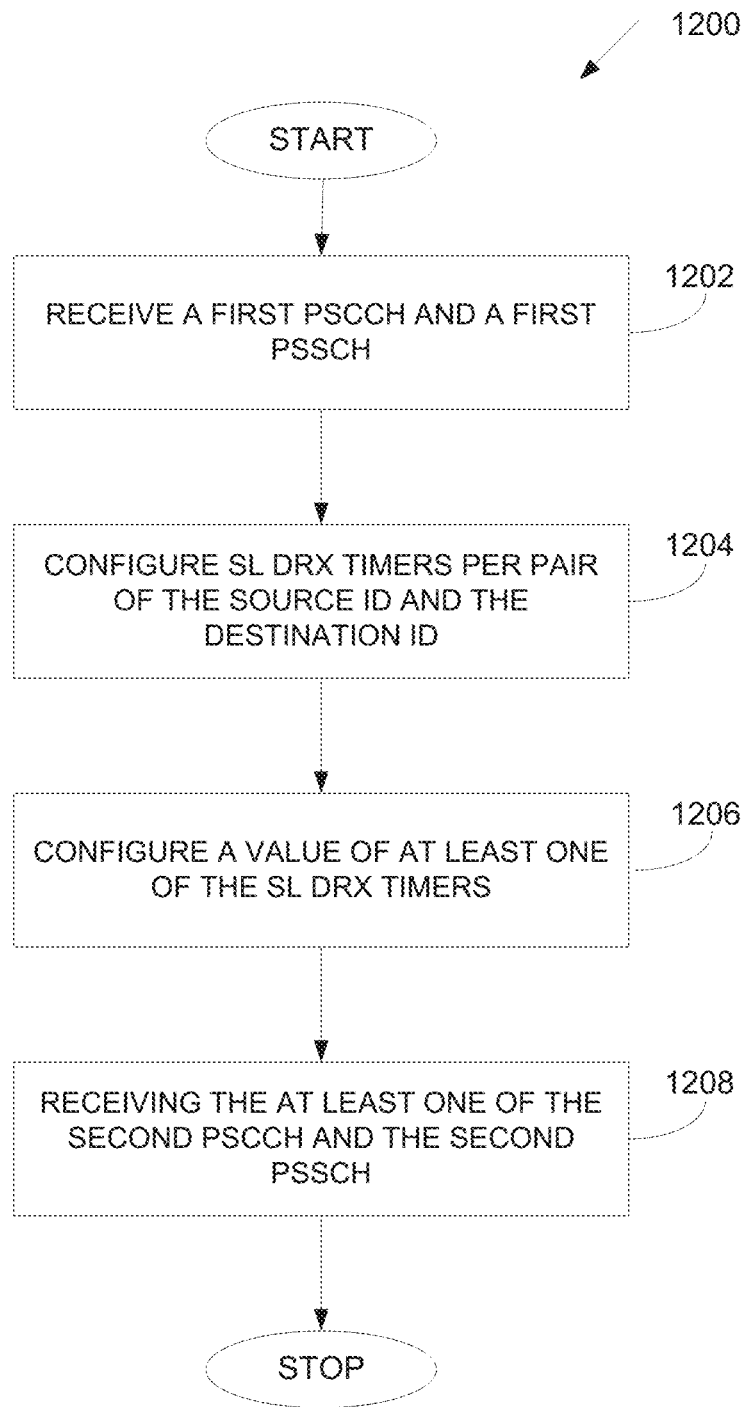
FIG. 12 illustrates a flow chart of a method for a sidelink DRX operation according to embodiments of the present disclosure.

FIG. 12 illustrates a flow chart of a method 1200 for a sidelink DRX operation according to various embodiment of the present disclosure. The method 1200 as may be performed by a UE (e.g., 111-116 as illustrated in FIG. 1). An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As illustrated in FIG. 12, the method 1200 begins at step 1202. In step 1202, a first UE receives, from a second UE for a SL DRX operation, a first PSCCH and a first PSSCH, wherein the first PSCCH and the first PSSCH include SCI comprising a source ID, a destination ID, and SL DRX time information indicating when the first UE monitors or skips at least one of a second PSCCH and a second PSSCH for the SL DRX operation.

In step 1204, the first UE configures SL DRX timers per pair of the source ID and the destination ID. In step 1206, the first UE configures a value of at least one of the SL DRX timers based on information of the SCI. In step 1208, the UE receives the at least one of the second PSCCH and the second PSSCH based on the SL DRX timers when the SL DRX operation is applied to a SL communication identified by the pair of the source ID and destination ID.

In one embodiment, the UE identifies a set of resources based on the information of the SCI including a time resource assignment information, configures a value of a SL DRX HARQ RTT timer, the value corresponding to a time duration between a reception time instance of the first PSCCH and PSSCH, and a time instance indicated by the identified set of resources, configures a value of a SL DRX HARQ retransmission timer, starts the SL DRX HARQ RTT timer if data carried by the second PSSCH that is assigned by the SCI is not successfully decoded, and starts SL DRX HARQ retransmission timer in response to expiry of the SL DRX HARQ RTT timer.

In one embodiment, the first UE skips monitoring the second PSCCH and PSSCH during a time period in which the SL DRX HARQ RTT timer is running and monitors the second PSCCH and PSSCH during a time period in which the SL DRX HARQ retransmission timer is running. In such embodiment, the SL DRX HARQ retransmission timer is configured by at least one of a PC5 RRC signaling, system information, pre-configuration information, or a fixed value.

In one embodiment, the UE identifies a set of resources based on the information of the SCI including resource reservation period information, configures a value of a first SL DRX timer, the value corresponding to a time duration between a reception time instance of the first PSCCH and PSSCH, and a time instance indicated by the identified set of resources, configures a value of a second SL DRX timer, starts the first SL DRX timer after the reception time instance of the first PSCCH and PSSCH, and starts the second SL DRX timer in response to expiry of the first SL DRX timer.

In one embodiment, the UE skips monitoring the second PSCCH and PSSCH during a time period in which the first SL DRX timer is running and monitors the second PSCCH and PSSCH during a time period in which the second SL DRX timer is running. In such embodiment, the second SL DRX timer is configured by at least one of a PC5 RRC signaling, system information, pre-configuration information, or a fixed value.

In one embodiment, the UE determines whether the SL DRX operation is applied to the SL communication using the information that is included in at least one of the SCI, a layer 2 signaling of MAC, PC5 RRC, system information, or pre-configuration information.

In one embodiment, the UE configures the first UE as an RX UE to receive a SL transmission from the second UE, the second UE being a TX UE for the SL DRX operation with the RX UE.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A first user equipment (UE) in a wireless communication system supporting a sidelink (SL) communication, the UE comprising:
   a transceiver configured to receive, from a second UE, first sidelink control information (SCI), wherein the first SCI includes time resource information and resource reservation period information; and
   a processor operably connected to the transceiver, the processor configured to:
      determine an active time for SL discontinuous reception (DRX) based on the time resource information or the resource reservation period information, and
      monitor second SCI in the active time,
   wherein, in case that the active time is determined based on the time resource information, the active time includes a time while the SL DRX retransmission timer is running, and
   wherein, in case that the active time is determined based on the resource reservation period information, the active time includes a time associated with at least one resource transmission.

2. The first UE of claim 1, wherein, in case that the active time is determined based on the time resource information, the processor is further configured to:
   derive a value of an SL DRX hybrid automatic repeat request (HARQ) round trip time (RTT) timer from resource information in the first SCI;
   start the SL DRX HARQ RTT timer; and
   based on an expiration of the SL DRX HARQ RTT timer, start an SL DRX retransmission timer, and
   wherein the active time includes a time while the SL DRX retransmission timer is running.

3. The first UE of claim 2, wherein the processor is further configured to skip monitoring a first physical sidelink control channel (PSCCH) and a first physical sidelink shared channel (PSSCH) during a time period in which the SL DRX HARQ RTT timer is running.

4. The first UE of claim 1, wherein, in case that the active time is determined based on the resource reservation period information, the at least one resource transmission is based on the resource reservation period included in the first SCI.

5. A method of a first user equipment (UE) in a wireless communication system supporting a sidelink (SL) communication, the method comprising:
    receiving, from a second UE, first sidelink control information (SCI), wherein the first SCI includes time resource information and resource reservation period information;
    determining an active time for an SL discontinuous reception (DRX) based on the time resource information or the resource reservation period information; and
    monitoring second SCI in the active time,
    wherein, in case that the active time is determined based on the time resource information, the active time includes a time while the SL DRX retransmission timer is running, and
    wherein, in case that the active time is determined based on the resource reservation period information, the active time includes a time associated with at least one resource transmission.

6. The method of claim 5, wherein, in case that the active time is determined based on the time resource information, determining the active time comprises:
    deriving a value of an SL DRX hybrid automatic repeat request (HARQ) round trip time (RTT) timer from resource information in the first SCI;
    starting the SL DRX HARQ RTT timer; and
    based on an expiration of the SL DRX HARQ RTT timer, starting an SL DRX retransmission timer,
    wherein the active time includes a time while the SL DRX retransmission timer is running.

7. The method of claim 6, further comprising skipping monitoring a first physical sidelink control channel (PSCCH) and a first physical sidelink shared channel (PSSCH) during a time period in which the SL DRX HARQ RTT timer is running.

8. The method of claim 5, wherein, in case that the active time is determined based on the resource reservation period information, the at least one resource transmission is determined, based on the resource reservation period information included in the first SCI.

9. A second user equipment (UE) in a wireless communication system supporting a sidelink (SL) communication, the UE comprising:
    a processor; and
    a transceiver operably connected to the processor, the transceiver configured to transmit, to a first UE first sidelink control information (SCI), wherein the first SCI includes time resource information and resource reservation period information,
    wherein an active time for SL discontinuous reception (DRX) based on the time resource information or the resource reservation period information first SCI is determined and second SCI in the active time is monitored,
    wherein, in case that the active time is determined based on the time resource information, the active time includes a time while the SL DRX retransmission timer is running, and
    wherein, in case that the active time is determined based on the resource reservation period information, the active time includes a time associated with at least one resource transmission.

10. The second UE of claim 9, wherein, in case that the active time is determined based on the time resource information:
    a value of an SL DRX hybrid automatic repeat request (HARQ) round trip time (RTT) timer is derived from resource information in the first SCI;
    the SL DRX HARQ RTT timer is started;
    based on an expiration of the SL DRX HARQ RTT timer, start an SL DRX retransmission timer; and
    the active time includes a time while the SL DRX retransmission timer is running.

11. The second UE of claim 10, wherein a monitoring of a first physical sidelink control channel (PSCCH) and a first physical sidelink shared channel (PSSCH) is skipped during a time period in which the SL DRX HARQ RTT timer is running.

12. The second UE of claim 9, wherein, in case that the active time is based on the resource reservation period information, the at least one resource transmission is based on the resource reservation period included in the first SCI.

* * * * *